United States Patent [19]

Dooley

[11] 4,172,900
[45] Oct. 30, 1979

[54] NATURAL CHEESE OF INTENSIFIED FLAVOR

[75] Inventor: J. Gordon Dooley, Glenview, Ill.

[73] Assignee: Kraft, Inc., Glenview, Ill.

[21] Appl. No.: 779,336

[22] Filed: Mar. 21, 1977

Related U.S. Application Data

[63] Continuation of Ser. No. 596,910, Jul. 17, 1975, abandoned, which is a continuation-in-part of Ser. No. 425,300, Dec. 17, 1973, abandoned, which is a continuation-in-part of Ser. No. 215,880, Jan. 6, 1972, abandoned.

[51] Int. Cl.² .............................................. A23C 19/02
[52] U.S. Cl. ...................................... 426/38; 426/35; 426/582
[58] Field of Search .................. 426/36, 38, 582, 35

[56] References Cited

U.S. PATENT DOCUMENTS

| | | | |
|---|---|---|---|
| 2,531,329 | 11/1950 | Farnham | 426/35 |
| 2,793,122 | 5/1957 | Erekson | 426/36 |
| 3,295,991 | 1/1967 | Cort et al. | 426/38 |
| 3,348,952 | 10/1967 | Hori et al. | 426/42 |
| 3,650,768 | 3/1972 | Rorberts | 426/35 |

OTHER PUBLICATIONS

Kosikowski; F., Cheese and Fermented Milk Foods, published by the Author, Cornell University, Ithaca, N.Y., 1966, (pp. 297–298).

*Primary Examiner*—David M. Naff
*Attorney, Agent, or Firm*—Fitch, Even & Tabin

[57] ABSTRACT

The present invention is directed to a natural cheese product having a highly intensified American cheese flavor and to a method for preparing such cheese product. The cheese product is adapted for use as a cheese flavoring ingredient in cooked products, for example, process cheese. In the method, curd particles are produced, mixed with salt, a source of a lipolytic enzyme, and a source of a proteolytic enzyme, and cured for a period of time sufficient to produce increased levels of $C_2$–$C_{10}$ fatty acids as compared to conventional American-type cheese.

20 Claims, 5 Drawing Figures

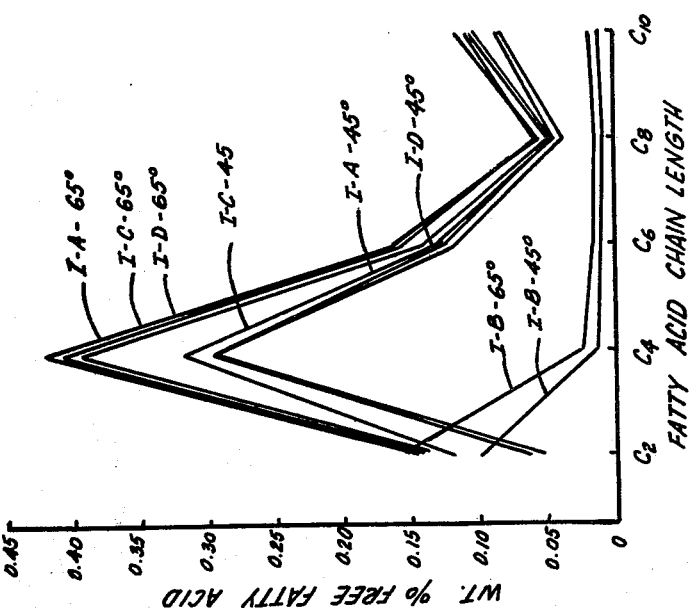
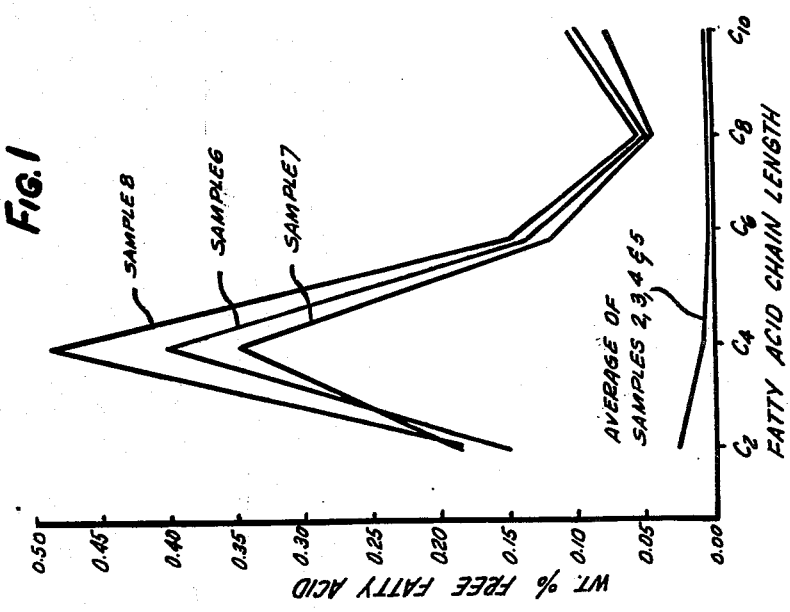

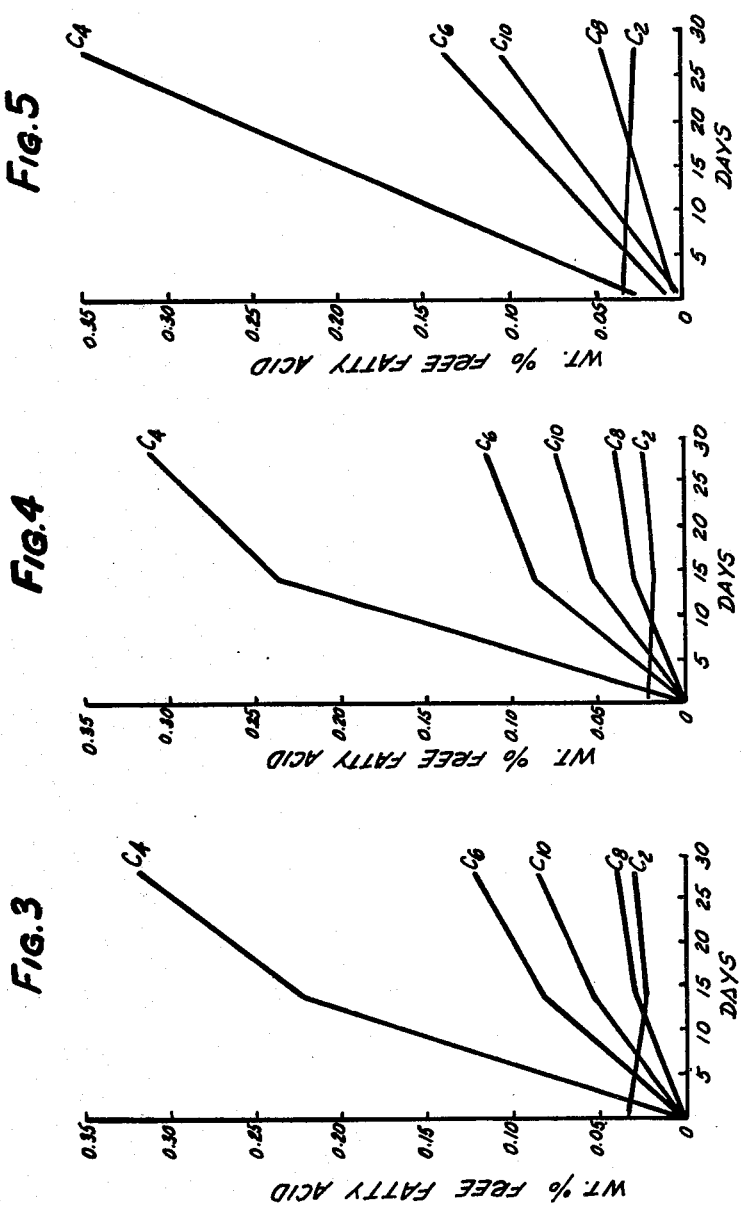

NATURAL CHEESE OF INTENSIFIED FLAVOR

This is a continuation of Ser. No. 596,910, filed July 17, 1975, now abandoned which is a continuation-in-part application of Ser. No. 425,300, filed Dec. 18, 1973, now abandoned, which is a continuation-in-part application of Ser. No. 215,880, filed Jan. 6, 1972, now abandoned.

The present invention relates generally to a natural cheese product having a highly intensified cheese flavor and to a method for manufacturing such cheese product. More particularly, the present invention is directed to a natural cheese product having an intensified American cheese flavor which is useful in the manufacture of process cheese and other cheese products or cheese-containing products wherein a high level of cheese flavor is desirable. American cheese and American-type cheese are descriptive terms used to identify a group of cheeses which includes Cheddar cheese, Colby cheese, Monterey cheese, Jack cheese, and stirred-curd, washed-curd, and soaked-curd Cheddar type cheese, all of which have a generally similar American cheese flavor. The cheese product of the present invention has an American cheese flavor, but the flavor is of such intensity that it would not generally be considered palatable when consumed alone. However, when added to cooked cheese-containing products, such as process cheese and baked goods, in relatively small amounts it imparts an American-type cheese flavor to such product, and therefore may replace all or a part of the aged American cheese normally added to such products as a flavoring ingredient.

The intensely flavored cheese product of the present invention is particularly useful as a flavoring ingredient in the manufacture of process cheese, cheese foods, and/or cheese spread. The term "process cheese" refers to cheese which is made by grinding and mixing together, with heating and stirring, one or more natural cheeses of the same or two or more varieties. An emulsifying agent is added to the mixture, and the mixture is worked into a homogeneous, plastic mass. Various acids may be added, such as lactic acid, citric acid, acetic acid, phosphoric acid, or vinegar. The moisture level of process cheese generally does not exceed about 40 percent, and process cheese has a minimum fat level of about 50 percent on a dry basis.

The term "cheese food" refers to a cheese product which is prepared generally from the same materials and the same process indicated above for process cheese. However, cheese food may have optional diary ingredients added thereto, such as cream, milk, skim milk, whey, or any of these from which part of the water has been removed. The moisture level of cheese food is generally higher than that of process cheese, and may be up to about 44 percent. The fat is at least about 23 percent, but is usually less than 50 percent.

The term "cheese spread" refers to a cheese product which is generally similar to cheese food products but may have a moisture level of up to 60 percent. The minimum fat level for cheese spread is about 20 percent.

The term "process cheese" is sometimes used generically to refer to any of the various types of cheese products which are made by grinding various types of natural cheese and mixing such ground cheese with added emulsifier and heating until a uniform plastic cheese mass is obtained. As used herein, the term "process cheese" is intended to include cheese spread and cheese foods and also powdered cheese products made by spray drying process cheese in accordance with well known practices.

It is the usual practice in the manufacture of process cheese to use a combination of cheeses including an aged cheese for flavor, a "short-held" cheese having a minimal cheese flavor, and a green curd which is unaged or uncured and has no flavor. The aged cheese is usually an American-type cheese, e.g., Cheddar cheese, but may be another natural aged cheese, such as Swiss cheese.

The production of aged Cheddar cheese requires many months of curing to develop the level of flavor normally associated with aged Cheddar cheese. As used herein, the term "highly flavored cheese product" or "cheese product having an intensified American cheese flavor" refers to a natural cheese product which has a flavor level that is significantly greater than that normally associated with conventional aged American cheese. Such highly flavored cheese product may or may not have suitable flavor characteristics for direct eating. Usually, the highly flavored cheese product is used as a flavoring component in cheese or other food products, and, more particularly, in products which are cooked, as described in detail hereinafter.

Various attempts have been made to reduce the curing time required to produce American cheese having a desired aged cheese flavor and together with acceptable body and texture. To accomplish this result, the make procedure and/or curing temperature conventionally employed has been altered. An example of one such process is described in U.S. Pat. No. 3,175,915. In addition to developing the characteristic flavor of aged cheese, such products must also have the texture, body, aroma, and mouth feel normally associated with aged cheese.

Another area of development with respect to cheese flavor is that of the addition of various chemicals and/or enzymes to the milk prior to setting or to the curd after separation of whey. Addition of particular enzymes to the milk is disclosed in U.S. Pat. No. 3,650,768 for the purpose of increasing flavor development when heat-treated milk is utilized. Other examples of prior art processes utilizing enzymes are set forth in U.S. Pat. Nos. 3,295,991 and 2,531,329. These processes also produce flavor and other characteristics generally similar to aged natural cheese.

Cheese flavoring products intended for use as flavoring ingredients have also been developed as exemplified by U.S. Pat. Nos. 3,840,672 and 3,729,326. These products, generally in powder form, are intended to be used as flavoring ingredients and are not consumed directly.

It would be desirable to provide a natural cheese product having an intensified American cheese flavor. It would be particularly desirable to provide a method for the manufacture of such a cheese product with an intensified American cheese flavor in a relatively short curing time, i.e., in less than about three months.

Accordingly, it is a principal object of the present invention to provide a natural cheese product having an intensified American cheese flavor and a method of manufacturing such cheese product. It is another object of the present invention to provide a method for the manufacture of a natural cheese product having an intensified American cheese flavor in a reduced period of time. It is a further object to provide a method for the manufacture of process cheese utilizing a natural cheese product of intensified American cheese flavor.

These and other objects of the present invention will become more apparent from the following detailed description and from the drawings of which:

FIG. 1 is a graph depicting the free fatty acid distribution of cheese products in accordance with a preferred embodiment of the present invention and natural aged Cheddar cheese.

FIG. 2 is a graph similar to FIG. 1 illustrating the effect of curing temperature on free fatty acid development.

FIG. 3 is a graph depicting the rate of free fatty acid development of Example II.

FIG. 4 is a graph depicting the rate of free fatty acid development of Example III.

FIG. 5 is a graph depicting the rate of free fatty acid development of Example IV.

Generally, the present invention is directed to a natural cheese product having increased levels of $C_2$–$C_{10}$ fatty acids and an intensified American cheese flavor as compared to conventional aged natural American cheese.

More particularly, the present invention relates to an American-type cheese product having a $C_2$–$C_{10}$ fatty acid content at least about ten times the $C_2$–$C_{10}$ fatty acid content of conventional aged American-type cheese.

The present invention further relates to a method of manufacturing a natural American-type cheese product of intensified American cheese flavor which includes providing a mixture of curd particles and whey by any one of a number of known American-type cheese make procedures, separating the whey from the curd, adding salt, a source of a proteolytic enzyme, and a source of a lipolytic enzyme to the curd, and curing the curd at a temperature above about 50° F. for a period of time sufficient to provide a $C_2$–$C_{10}$ fatty acid content at least about ten times as great as the $C_2$–$C_{10}$ fatty acid content of conventional aged natural American-type cheese. When expressed as percentage of fatty acids in the cheese, American-type cheese produced by the present invention has a total free $C_2$–$C_{10}$ fatty acid content of at least about 0.46 percent and a free $C_4$ fatty acid content of at least about 0.32 percent by weight.

A proteolytic micrococcus and a flavor culture, as described hereinafter, may also be added to the curd with the proteolytic enzyme and the lipolytic enzyme to provide a natural cheese product which, when used as a flavoring ingredient in cooked cheese-containing products, provides a more rounded and fuller American-type cheese flavored product. It has also been found desirable, particularly when the cheese product of the invention is utilized in the manufacture of process cheese, to prepare the cheese curd using a make procedure as described in U.S. Pat. No. 3,650,768 in which a proteolytic micrococcus, a self-limiting lipase, and a flavor culture are added to the milk prior to setting of the milk.

The preferred medium for preparing the highly flavored cheese product of the present invention is whole cow's milk having about 3 percent protein which is principally casein, about 5 percent lactose, about 1 percent ash, and about 3.5 percent fat. The milk may be partially or wholly skimmed, and other fats may be used to replace or supplement a portion of the milk fat of the whole milk. In this connection, preferred fats for replacement of milk fat are coconut fat, soybean oil, cottonseed oil, peanut oil, safflower oil, and mixtures thereof. Other protein sources may also be used in combination with the casein of the whole milk. In this connection, up to about 50 percent of the casein may be replaced with protein sources such as soy protein, yeast protein, fish meal protein, whey protein, and mixtures thereof.

The preferred method for preparing curd particles to which the enzymes and cultures of the present invention are applied is known and is usually referred to as the stirred curd method. In this method, a lactic acid producing culture, preferably *S. lactis*, is added to the medium. The medium is set with single strength calves rennet at a level of about 100 cc's of rennet per 1000 pounds milk. A setting period of thirty minutes is allowed after addition of the rennet for coagulation of the medium. The coagulum is cut with quarter-inch knives to provide curd particles and whey when the titratable acidity of the coagulum is about 0.11 to about 0.12 equivalent lactic acid, and the pH of the whey is about 6.4 as measured by the quinhydrone method. As set forth herein, all reference to titratable acidity refers to equivalent lactic acid, and all pH values are measured by the quinhydrone method. After cutting, the curd particles are stirred in the whey and the curd particles are then heated over a period of thirty minutes to a temperature of about 103° F. to cook the curd. The curd is held while being stirred in the whey at 103° F. until the titratable acidity of the whey is about 0.17 and the curd has a pH of about 5.8, a period of about sixty minutes. The curd and whey mixture is then pumped to a drain table while the temperature of 103° F. is maintained. The whey is drawn from the curd until the level of whey is slightly higher than the level of the curd. The curd is stirred in the whey for a period of about sixty minutes or until the titratable acidity of the whey is about 0.28 and then the whey is allowed to freely drain from the curd. The curd at this time has a pH of about 5.36.

After a period of about fifteen minutes of free whey drainage, the curd is salted with sodium chloride at a level of about 2.0 pounds of salt per 1000 pounds of medium used to prepare the curd and a source of a lipolytic enzyme, i.e., a lipase, and a source of a proteolytic enzyme, i.e., a protease, are added to the curd. The preferred source of lipase is that obtained by extraction from the throat tissue of calves, lambs, or kids. These lipases are commercially available under the trade names Italase C and Capalase KL and their manufacture is generally disclosed in U.S. Pat. Nos. 2,531,329 and 2,794,743. These particular lipases are self-limiting in the hydrolysis of fat and do not break down the fat to undesired end products. Such lipases are sometimes referred to herein as "self-limiting lipases" to denote their restricted activity in the hydrolysis of fat.

Other forms of lipolytic enzymes, such as microbial lipases and pancreatic lipases, may be substituted for all or a part of the throat tissue lipases. An example of a commercially available microbial lipase is that obtained from *Candida cylindracea*, Type VIII. An example of a commercially available pancreatic lipase is that sold as porcine pancreatic lipase. One unit of the *C. cylindracea* microbial lipase will hydrolyze 1.0 microequivalent of fatty acid from a triglyceride in one hour at pH 7.4 at 37° C. One unit of the porcine pancreatic lipase will release 1.0 micromole of acid per minute at pH 8.0 at 25° C. from an olive oil substrate.

The results of a comparison of throat tissue lipase, microbial lipase, and pancreatic lipase are set forth in Table I. The respective samples were incubated in 36 percent butterfat Grade A whipping cream, fatty acids were removed by steam distillation, and fatty acid analysis was by gas chromatography. A control sample, with no addition of lipase, was incubated at room temperature for four and one-half hours.

TABLE I

| Sample | Weight % Free Fatty Acid | | | | | |
|---|---|---|---|---|---|---|
| | $C_2$ | $C_4$ | $C_6$ | $C_8$ | $C_{10}$ | $C_{12}$ |
| Control | — | 0.001 | 0.001 | 0.001 | 0.002 | 0.001 |
| P-10[1] | — | 0.078 | 0.036 | 0.022 | 0.022 | 0.008 |
| P-50[2] | — | 0.180 | 0.086 | 0.051 | 0.074 | 0.042 |
| M-200[3] | — | 0.461 | 0.169 | 0.153 | 0.207 | 0.059 |
| C-200[4] | 0.003 | 0.061 | 0.018 | 0.009 | 0.016 | — |
| K-200[5] | 0.004 | 0.076 | 0.033 | 0.010 | 0.009 | — |
| KL-200[6] | 0.002 | 0.087 | 0.037 | 0.011 | 0.017 | — |

[1] 10 mg. porcine pancreatic lipase per 100 gm. cream incubated at room temperature 30 hours.
[2] Same as [1] except 50 mg. lipase per 100 gm. cream.
[3] 200 mg. C. cylindracea Candida microbial lipase per 100 gm. cream incubated at room temperature for 30 hours.
[4] 200 mg. Italase C calf tissue lipase per 100 gm. cream incubated 4½ hours at room temperature.
[5] 200 mg. Capalase K kid tissue lipase per 100 gm. cream incubated 4½ hours at room temperature.
[6] 200 mg. Capalase KL mixed kid and lamb tissue lipase per 100 gm. cream incubated 4½ hours at room temperature.

From the foregoing it can be seen that various sources of lipase may be utilized in the present invention, although suitable adjustments, within the skill of the art, may have to be made in concentration, curing temperature, and the like. For best results, however, the use of a combination of the self-limiting calf, kid, and lamb throat tissue lipases is preferred, and the examples and discussion herein are limited to their use.

The source of proteolytic enzyme may be selected from any one of a number of available materials which yield a protease enzyme having a high proteolytic activity. The type of protease and its manner of use act to enhance breakdown of the protein in the curd and to minimize formation of bitter peptides. Further, the protease causes complete breakdown of at least a portion of the protein to amino acids which is considered to be desirable to provide a more complete flavor profile in the finished product.

The source of protease may be added to the curd separately from the source of lipase, or, in some instances, the source of lipase may naturally contain sufficient quantities of proteases having the desired high proteolytic activity that an additional source of protease need not be added to the curd. In this connection, throat tissue lipases sold under the trade names Italase and Capalase have been found to contain sufficient protease that when a relatively high level of lipase is added to the curd no additional source of protease is required.

However, for most purposes, and to provide a desired flavor profile, particularly where the cheese product is to be incorporated in process cheese, a separate source of proteolytic enzyme is added to the curd in addition to that which may be present in the source of lipolytic enzyme. Examples of suitable proteolytic enzymes are those derived from plant sources, such as papain, and from microorganisms, such as those sold under the trade names Rhozyme P-11, Rhozyme P-53, and Rhozyme P-54 obtained from *A. flavus oryzae* and *B. subtilis*, and mixtures thereof.

The present invention contemplates that other proteolytic enzymes or proteases might also be used in the present invention. Selection of such proteolytic enzymes is considered to be within the skill of the art based upon known microbiological screening techniques. Regardless of the source of proteolytic enzyme, it should have a good proteolytic activity in a milk source under cheese making conditions and should not produce protein byproducts which impart bitter flavor to the cheese product.

In accordance with the present invention, it has been discovered that a highly intensified American-type cheese flavor can be imparted to a natural American-type cheese product by substantially increasing the $C_2$–$C_{10}$ fatty acid content of the cheese. This is in marked contrast to the fatty acid content of conventional aged American cheese, e.g. Cheddar cheese, which is very low and does not markedly change during the curing cycle. There is set forth in Table II the weight percent of the $C_2$–$C_{10}$ fatty acids of conventional Cheddar cheese at various ages.

TABLE II

| No. | Sample | Age | Weight % Free Fatty Acid | | | | |
|---|---|---|---|---|---|---|---|
| | | | $C_2$ | $C_4$ | $C_6$ | $C_8$ | $C_{10}$ |
| 1 | 4-15-C: Cheddar cheese mfd pursuant to U.S. Pat. No. 3,650,768 | 1 day | 0.008 | 0.001 | — | 0.001 | 0.001 |
| 2 | Same as No. 1 | 28 days | 0.010 | 0.016 | 0.004 | 0.002 | 0.008 |
| 3 | New York Sharp Cheddar mfd pursuant to U.S. Pat. No. 3,650,768 | 7 mos. | 0.011 | 0.014 | 0.004 | 0.002 | 0.003 |
| 4 | Wisconsin Natural Cheddar cheese | 7 mos. | 0.026 | 0.006 | 0.003 | 0.002 | 0.004 |
| 5 | 5-2-1-1 Sharp Cheddar cheese | 6 mos. | 0.050 | 0.007 | 0.003 | 0.002 | 0.007 |

It can be seen from Table II that there is no appreciable free $C_2$–$C_{10}$ fatty acids present in conventional Cheddar cheese throughout its curing cycle. The average fatty acid content of Samples 2, 3, 4, and 5 appear as the lower curve in FIG. 1.

The natural cheese products of intensified flavor of the present invention have a substantially increased free fatty acid content as compared to the conventional aged Cheddar cheeses set forth in Table II. There is set forth in Table III the weight percent of the $C_2$–$C_{10}$ fatty acids of production size quantities of a preferred cheese having an intensified flavor manufactured in accord with the present invention in which the milk is inoculated with a proteolytic micrococcus and a self-limiting lipase, and a proteolytic micrococcus and flavoring microorganism are added to the curd in addition to the lipolytic enzyme and proteolytic enzyme.

TABLE III

| No. | Age | Weight % Free Fatty Acid | | | | |
|---|---|---|---|---|---|---|
| | | $C_2$ | $C_4$ | $C_6$ | $C_8$ | $C_{10}$ |
| 6 | 115 days | 0.151 | 0.403 | 0.137 | 0.048 | 0.102 |
| 7 | 105 days | 0.184 | 0.349 | 0.120 | 0.044 | 0.079 |

TABLE III-continued

| | | Weight % Free Fatty Acid | | | | |
|---|---|---|---|---|---|---|
| No. | Age | $C_2$ | $C_4$ | $C_6$ | $C_8$ | $C_{10}$ |
| 8 | unknown | 0.170 | 0.490 | 0.152 | 0.051 | 0.103 |

The free fatty acid distribution curves of Samples 6, 7, and 8, as well as the average free fatty acids of conventional Cheddar cheese samples 2, 3, 4, and 5 are plotted in FIG. 1. It is readily apparent that the free fatty acid content of the natural cheese of the present invention greatly exceeds that of conventional American-type cheese. In this connection, it is believed that the $C_2$ fatty acid content is not as important as the $C_4$–$C_{10}$ fatty acid content. The marked increase in the $C_4$ fatty acid, as compared to the $C_6$, $C_8$, and $C_{10}$ fatty acids in Samples 6, 7, and 8, as compared to Samples 2, 3, 4, and 5, is believed to be important to the provision of an intensified American-type cheese flavor in the cheese products of the present invention.

FIG. 1 demonstrates that the preferred natural cheese products of the present invention have a $C_2$–$C_{10}$ fatty acid content at least about twenty to thirty times as great as the free fatty acid content of conventional aged American-type cheese. As the increased amounts of free fatty acids decrease, the intensity of flavor of the cheese product decreases. Accordingly, in order to provide a sufficient intensity of flavor in the cheese product, the $C_2$–$C_{10}$ free fatty acid content of the cheese product of the present invention should be no less than ten times the free fatty acid content of conventional American-type cheese.

In addition to the foregoing, it is believed that the drastically increased $C_4$ fatty acid content of the cheese product of the present invention is at least partially responsible for the intensified American-type cheese flavor that is obtained. Referring to FIG. 1, it will be seen that the average $C_4$ fatty acid content of production lots in accordance with the preferred embodiment of the invention is at least about thirty times the $C_4$ fatty acid content of the average of Samples 2, 3, 4, and 5. Sample 7, having the lowest $C_4$ fatty acid content of the production samples, has a $C_4$ fatty acid content in excess of ten times the $C_4$ fatty acid content of Sample 4, which has the maximum $C_4$ fatty acid content of the conventional aged Cheddar cheeses set forth in Table I.

It is to be understood that the amount of free fatty acid in cheese varies from lot to lot depending on milk source, enzyme source, and the like. It is therefore difficult to state precisely the free fatty acid content that is necessary to obtain the benefits of the present invention with particularity. It is known, however, that the addition of a source of lipase and a source of protease in accordance with the present invention provides a cheese product of intensified flavor which has a greatly increased free fatty acid content. It is believed, based upon present knowledge, that this increase should be in excess of ten times. However, the addition of lipase and protease which do not attain a tenfold fatty acid increase but yet provide an intensified flavor level equivalent to that described herein are considered to be within the spirit of the present invention.

In a preferred embodiment of the invention, a proteolytic micrococcus culture is used in combination with the source of lipase and source of protease. The proteolytic micrococcus appears to act with the lipase and protease to provide a controlled level of peptide formation which contributes to the intensified American-type cheese flavor of the cheese product of the invention. The proteolytic micrococcus is a particular microorganism which provides controlled protein breakdown during curing of the cheese. The preferred proteolytic micrococcus for this invention is a *Micrococcus Cohn* selected from subgroups 1 to 4 inclusive. A particularly preferred proteolytic micrococcus is a *Micrococcus Cohn* subgroup 2. The classification of *Micrococcus Cohn* and the manner of determination of the subgroups is reported in *Identification Methods for Microbiologists*, Gibbs and Skinner (1966). The relative characteristics of *Micrococcus Cohn* subgroups 1 through 4 are set forth in U.S. Pat. No. 3,650,768, the disclosure of which is incorporated by reference.

The proteolytic micrococcus to be used in accord with this invention will be acetoin positive and convert glucose to acid under aerobic conditions. It has been found that more preferred results are achieved with microorganisms from *Micrococcus Cohn* subgroup 2 and even more preferred results are obtained when the *Micrococcus Cohn* are microorganisms of subgroup 2 which are obtained from raw milk.

It has been found that microorganisms from *Micrococcus Cohn* subgroups 5 through 8, inclusive, are not satisfactory for the production of the desired high flavor level. Microorganisms in these subgroups 5 to 8, inclusive, are acetoin negative and some in these subgroups are weak or negative in converting glucose to acid under aerobic conditions.

A preferred proteolytic micrococcus is a proteolytic micrococcus obtained from the University of Wisconsin designated T-3 and deposited in the American Type Culture Collection, No. 21829. The cultural and biochemical characteristics of T-3 micrococcus are also set forth in U.S. Pat. No. 3,650,768.

It has been found that when the *Micrococcus Cohn* subgroups 1 to 4, inclusive, microorganisms are added to the curd in addition to the lipase and protease, there is a clear contribution to the quality of the intensified cheese flavor that is not established without the addition of these microorganisms. It has also been found that this improvement is noticeable under the curing conditions described herein and is carried over into the products to which the cheese product of the invention is added.

Proteolysis and lipolysis of the protein and fat in the cheese curd to provide the desired breakdown of protein and fat occurs during curing of the cheese curd. In this connection, the level of protein and fat breakdown is greatly enhanced in a shortened period of time when the lipase, protease, and proteolytic micrococcus combination of the invention are added to the curd particles after drainage of the whey and prior to pressing the curd particles into a cheese shape, and, as previously discussed, the $C_2$–$C_{10}$ fatty acid content is increased to at least about ten times the $C_2$–$C_{10}$ fatty acid content of conventional American-type cheese during curing.

While not wishing to be bound by any theory, it is believed that the proteolytic micrococcus of the combination continues to grow slowly under the acidic conditions developed during curing of the cheese. In this connection, the proteolytic activity of the micrococcus is primarily due to products produced by and during the growth of the micrococcus and acts to hydrolyze the protein into various protein fragments in addition to the hydrolysis provided by the added protease.

In accordance with the method of the present invention, the cheese containing the added source of lipase and added source of protease is cured, preferably at elevated temperatures as compared to usual curing temperatures for American-type cheese, until the desired $C_2$–$C_{10}$ fatty acid level is reached. It is usual to cure an American-type cheese product at a temperature of about 40° F. The method of the present invention may utilize curing temperatures of up to about 100° F. although it is usually desirable to provide a curing temperature in the range of from about 50° F. to about 85° F., preferably 72° F. The time required to develop an intensified flavor level is inversely proportional to the temperature at which curing is effected. At temperatures of 40° F., the time required to develop a desired intensified flavor is usually from about six months to one year and this is considered to be an excessive curing time for the cheese product described herein. At curing temperatures approaching 90° F. an intensified flavor may be developed in from about one month or less. However, too high curing temperatures may result in undesirable gas formation and development of off flavors and the like. Accordingly, it is preferred to cure at a temperature of 50° F. to 85° F., preferably 72° F. for about six weeks whereupon a natural American-type cheese having an intensified flavor is obtained. If the temperature is then reduced to 45° F., little additional flavor development occurs and the cheese product may be held for extended periods of time without development of off flavors and the like.

A distinguishing feature of the cured, intensely flavored cheese product of the invention is that little knitting of the individual curd particles occurs. After curing, the cheese blocks may be easily crumbled to provide flavored curd particles of substantially the same shape as before curing which are particularly suitable for providing cheese flavor in various products, such as process cheese and baked goods. It is also possible to provide an intensely flavored cheese powder by preparing an aqueous slurry of comminuted cured cheese and thereafter spray-drying the slurry.

The amounts of lipase that is added to the curd are selected to provide the desired $C_2$–$C_{10}$ fatty acid development depending upon the temperature and length of the curing cycle. The lipolytic action, as well as the proteolytic action, on the cheese continue until inactivated, for example, by cooking or cooling to low temperature.

When the throat tissue lipase described herein is used at a level of from about 20 to about 45 grams per 100 pounds of curd, the desired $C_2$–$C_{10}$ fatty acid content is achieved. Alternate lipase sources may be used at equivalent levels depending upon respective activities.

The protease should be added at a level sufficient to provide a desired amount of protein breakdown to amino acids and peptides, but should not be added at such high levels as to generate undesired flavors. At levels of addition of a dry Rhozyme P-11 protease preparation below about 1 gram per 100 pounds of curd, there is little flavor contribution to the level of amino acids produced. At levels of addition above about 10 grams of dry, powdered protease preparation per 100 pounds of curd, an off-flavor may be produced. Generally, between about 5 and about 7.5 grams per 100 pounds of curd is used. As with the lipase, other proteases may be added at equivalent levels depending upon activity.

The proteolytic micrococcus, if used, is added at a level sufficient to provide a viable culture.

When a natural cheese is produced containing the above-described combination of lipase, protease, and proteolytic micrococcus, the cheese has a desirable highly intensified American-type cheese flavor. However, the flavor may be unduly harsh for some purposes and a more rounded flavor may be desirable for some uses. It has been found that an improved rounded flavor can be provided when a lactobacillus or a closely related microorganism is also added to the curd on the drain table. Such a lactobacillus may be referred to as a flavoring microorganism. Addition of such a microorganism is optional, but may be used where a particular flavor is desired. Various homofermentative lactobacilli may be used, such as *Lactobacillus lactis*, *Lactobacillus bulgaricus*, and *Lactobacillus caseii*. Preferred homofermentative lactobacilli are particular strains of *L. lactis* and *L. caseii*. The lactobacillus microorganism will also develop some acidity in the curd during curing. However, as previously stated, the lactobacillus microorganism is primarily used when a particular flavor is desired. A preferred *L. lactis* microorganism has the following characteristics:

| | |
|---|---|
| Temperature | |
| for growth 15° C. | — |
| 22° C. | + |
| 37° C. | + |
| 45° C. | + |
| 55° C. | + |
| Microscopic Evaluation | + Rod |
| Granules | + |
| Colony Appearance | Rough |
| NH$_3$ from Arginine | — |
| Lipolytic (Spirit Blue) | — |
| Catalase | — |
| Litmus Milk: Acid Dye | + |
| Reduction | + |
| Coagulation | + |
| % Acid in Milk | 1.74 |
| pH | 3.3 |
| Acid from: Galactose | ± |
| Glucose | + |
| Lactose | + |
| Maltose | ± |
| Mannitol | — |
| Salicin | + |
| Sorbitol | — |
| Sucrose | ± |
| Trehalose | + |

When used, the lactobacillus or closely related microorganism is added as a milk culture of the microorganism. The milk culture is obtained by adding the lactobacillus microorganism to a suitable substrate and permitting growth of the microorganism to proceed until an equivalent lactic acid acidity of from about 1.0 percent to about 2.0 percent is obtained. The milk culture of the lactobacillus organism is then added to the curd which has been separated from the whey at a level of from about 0.1 to about 1.0 percent by weight of the culture per 100 pounds of curd. At levels above the stated range, an undesired flavor is sometimes detected. At levels below the stated range, there is little contribution to the flavor of the cheese produced from the curd after curing.

The various enzymes and cultures, as described herein, are preferably added to the curd on the drain table and prior to pressing. However, it is contemplated to add all or a part of the enzymes to the curd after partial curing. In this instance, the curd blocks are comminuted to provide curd particles prior to adding the enzymes and cultures thereto. After the addition of the enzymes and cultures to the curd particles, the curd particles may be compacted into a cheese block prior to further curing, or loose curd particles may be further cured without compacting.

It is recognized that the flavor contribution from the proteolytic micrococcus and the homofermentative lactobacillus flavoring microorganism may be due to an enzymatic reaction where an enzyme is produced as a product of the growth thereof during curing of the curd. In another embodiment of the present invention, such enzyme may be extracted from a proteolytic micrococcus or from a homofermentative lactobacillus culture and added directly to the curd as described herein. In such instances, the enzymes are added at a level equivalent to that which would be provided by the proteolytic micrococcus or the homofermentative lactobacillus if present. Similarly, the source of lipase and protease may be a culture medium instead of an isolate thereof which are described as the preferred embodiments herein.

The method of the present invention is particularly suitable for the manufacture of highly flavored American-type cheese from heat-treated milk. As used in the cheese art, heat-treated milk is milk which has been heated to at least 135° F. and cooled with no-hold. Such treatment generally destroys gas-forming microorganisms but is less than pasteurizing conditions, and such treatment may be referred to herein as subpasteurizing. The heat-treated medium may be pasteurized, which is generally understood to mean, in reference to milk, that the milk tests phosphatase negative, or may be sterilized, which is generally understood to mean that the microorganisms and enzymes present in the medium are substantially or completely destroyed.

American or other cheese produced from pasteurized or otherwise heat-treated milk lacks the flavor characteristically associated with the American or other cheese produced from raw milk. The problem of flavor development becomes more difficult as the heat treatment is increased. The method of the present invention, as indicated, is particularly suitable for the manufacture of highly flavored cheese from pasteurized or otherwise heat-treated milk utilizing an inoculated milk as disclosed in U.S. Pat. No. 3,650,768.

Various tests have been specified in the foregoing specification. These tests are generally standard and recognized tests so that the specification has not been elaborated with details as to test procedures.

The following examples further illustrate various features of the present invention, but are intended to in no way limit the scope of the invention which is defined in the appended claims.

EXAMPLE I 1000 pounds of raw milk is subjected to pasteurization heat treatment of 161° F. for sixteen seconds. The milk is cooled to a temperature of 88° F. and is inoculated with an *L. lactis* culture at a level of 15 pounds of the liquid culture per 1000 pounds of milk. 2½ pounds of a *Micrococcus Cohn* culture, subgroup 2, identified as T-3 by the University of Wisconsin, and 1 pound of a liquid culture of *L. caseii* liquid culture are also added to the milk. The inoculated milk is fermented for a period of one hour at a temperature of 89° F. until a titratable acidity of 0.165 is obtained in the milk.

The milk is then set with 100 cc's of single strength calves rennet per 1000 pounds of milk. A setting period of thirty minutes is allowed for coagulation of the milk after addition of the rennet. The coagulum that is formed is then cut into ¼ inch curd cubes with curd knives. The titratable acidity of the whey at the time of cutting is 0.115.

The curd is lightly stirred in the whey for a period of fifteen minutes after cutting and the curd is then cooked in the whey to a temperature of 102° F., allowing thirty minutes to attain the cooking temperature. The curd and whey are stirred vigorously for about ninety minutes after the cooking step until a titratable acidity in the whey of 0.165 is reached.

Thereafter, the curd and whey mixture is pumped to a drain table while maintaining a temperature of 102° F. The whey is drawn from the curd on the drain table until the whey level is slightly higher than that of the curd level. Further acidity is then developed in the curd while the curd and whey are maintained on the drain table. The remaining whey is drawn from the curd when the whey titratable acidity is 0.28 and the curd pH is 5.30. The whey is permitted to drain freely for about fifteen minutes. 94 pounds of curd are obtained.

The curd is then divided into four 23-pounds lots designated as Lots I-A, I-B, I-C, and I-D. Each of the lots of curd is salted with sufficient salt to provide 2 percent salt on the basis of the curd weight and proteolytic and lypolytic enzymes are added to the curd in accordance with the following schedule:

Lot I-A 7.5 grams Italase C; 5.25 grams Capalase KL
Lot I-B 1.5 grams Rhozyme P-11
Lot I-C 7.5 grams Italase C; 5.25 grams Capalase KL; 1.0 grams Rhozyme P-11
Lot I-D 7.5 grams Italase C; 5.25 grams Capalase KL; 1.5 grams Rhozyme P-11

Each of lots I-A, I-B, I-C, and I-D are divided into two portions for curing. All lots are cured at 72° F. for four weeks. Thereafter one-half of each lot is transferred to a cooler and maintained at 45° F. and the other half is maintained at 65° F. After approximately ninety days total elapsed time, the cheese products are analyzed for free fatty acid, the results of which are set forth in Table IV.

TABLE IV

| | Weight % Free Fatty Acid | | | | |
|---|---|---|---|---|---|
| Example | Age, Days | $C_2$ | $C_4$ | $C_6$ | $C_8$ | $C_{10}$ |
| I-A-45° F. | 91 | 0.063 | 0.295 | 0.128 | 0.047 | 0.102 |
| I-A-65° F. | 91 | 0.137 | 0.421 | 0.156 | 0.055 | 0.116 |
| I-B-45° F. | 92 | 0.100 | 0.012 | 0.010 | 0.009 | 0.011 |
| I-B-65° F. | 92 | 0.160 | 0.023 | 0.016 | 0.013 | 0.018 |
| I-C-45° F. | 93 | 0.120 | 0.319 | 0.132 | 0.047 | 0.107 |
| I-C-65° F. | 93 | 0.127 | 0.405 | 0.164 | 0.057 | 0.105 |
| I-D-45° F. | 87 | 0.054 | 0.296 | 0.119 | 0.038 | 0.081 |
| I-D-65° F. | 87 | 0.132 | 0.397 | 0.143 | 0.046 | 0.085 |

The free fatty acid distribution of Examples I-A through I-D are plotted in FIG. 2. Storage at 65° F. results in increased fatty acid development, particularly in $C_4$ fatty acids, as compared to storage at 45° F. It is therefore possible to exert control over the fatty acid content of the cheese product by altering and/or controlling the curing temperature, and permits speeding up or slowing down of the curing cycle by appropriate temperature adjustments. The free fatty acid development is slowed even further if the temperature is reduced below 45° F. and is completely stopped if the cheese product is frozen. While freezing of cheese is undesirable if the cheese is to be consumed as is, it does not detract from the cheese product of the invention when it is used as a flavoring ingredient in process cheese or in baked goods.

EXAMPLE II

A cheese curd is produced in accordance with Example I and after whey removal a twenty-three pound sample of curd is salted and 7.5 grams Italase C, 5.25 grams Capalase KL, and 1.0 grams of Rhozyme P-11 are added to the curd. The curd is then cured at 72° F.

Quantities of the cheese product were removed and frozen after one day, fourteen days, and twenty-eight days to stop development of fatty acids. The respective samples were analyzed for free fatty acid content and for percent total nitrogen by molecular weight fractions.

EXAMPLE III

A further quantity of cheese is made in accordance with Example I except the milk is not inoculated with the T-3 micrococcus and liquid culture of L. caseii. After whey removal twenty three pounds of curd is salted and 7.5 grams Italase C, 5.25 grams Capalase KL, and 1.0 grams Rhozyme P-11 are added to the curd. The curd is then cured at 72° F.

Quantities of cheese were removed and frozen after one, fourteen, and twenty-eight days and analyzed for free fatty acid and for percent total nitrogen by molecular weight fractions in the same manner as Example II. The results of the analysis of Examples II and III are set forth in Tables V and VI.

TABLE V

| | | Weight % Free Fatty Acid | | | | |
|---|---|---|---|---|---|---|
| Example | Age, Days | $C_2$ | $C_4$ | $C_6$ | $C_8$ | $C_{10}$ |
| II-A | 1 | 0.033 | 0.010 | 0.004 | 0.002 | 0.003 |
| II-B | 14 | 0.024 | 0.025 | 0.086 | 0.028 | 0.056 |
| II-C | 28 | 0.030 | 0.319 | 0.121 | 0.040 | 0.085 |
| III-A | 1 | 0.022 | 0.005 | 0.002 | 0.001 | 0.001 |
| III-B | 14 | 0.017 | 0.236 | 0.087 | 0.028 | 0.052 |
| III-C | 28 | 0.024 | 0.311 | 0.115 | 0.038 | 0.073 |

TABLE VI

| Example | Age, Days | % Acid Soluble N | % Total N | Acid Soluble N Total N | Molecular Weight Distribution | | | | |
|---|---|---|---|---|---|---|---|---|---|
| | | | | | 100,000 | 50,000-100,000 | 10,000-50,000 | 1,000-10,000 | 1,000 |
| II-A | 1 | 0.2 | 3.8 | 5.3 | — | — | — | — | — |
| II-B | 14 | 1.1 | 4.0 | 27.5 | 69.8 | 20.0 | 3.9 | 3.8 | 2.5 |
| II-C | 28 | — | — | — | 63.3 | 20.6 | 7.9 | 3.9 | 4.3 |
| III-A | 1 | 0.2 | 3.6 | 5.6 | — | — | — | — | — |
| III-B | 14 | 0.9 | 3.9 | 23.8 | 78.4 | 13.8 | 1.7 | 4.1 | 2.0 |
| III-C | 28 | — | — | — | 65.5 | 23.9 | 3.5 | 3.2 | 3.9 |

The free fatty acid data of Table V is depicted graphically in FIGS. 3 and 4 and illustrates the increase in free fatty acid as the curing process progresses. Except for the $C_2$ fatty acids, there is a definite increase in fatty acid content with the $C_4$ fatty acids increasing from a level of from about 0.01 to 0.02 percent at one day to in excess of 0.3 percent at twenty-eight days.

The molecular weight distribution data set forth in Table VI shows little difference between Examples II and III and compares favorably with conventional aged Cheddar cheese.

EXAMPLE IV

A further quantity of cheese is made in accordance with Example II with the further addition to the curd of 1 pound of T-3 micrococcus culture and 1 pounds of L. caseii culture per 100 pounds of curd. The curd is then cured at 72° F.

Samples of the cheese product were taken and frozen at one day and twenty-eight days curing time and analyzed for free fatty acids in the same manner as Examples II and III and the following results were obtained.

TABLE VII

| Example | Age, Days | $C_2$ | $C_4$ | $C_6$ | $C_8$ | $C_{10}$ |
|---|---|---|---|---|---|---|
| IV-A | 1 | 0.033 | 0.027 | 0.010 | 0.003 | 0.002 |
| IV-B | 28 | 0.027 | 0.350 | 0.138 | 0.045 | 0.106 |

The data of Table VII is plotted in FIG. 5. Comparison of FIG. 5 with FIGS. 3 and 4 show that the fatty acid development at the end of twenty-eight days is greater in Example IV than in Examples II and III and this is believed to be due to the addition of the proteolytic micrococcus and flavoring microorganism to the curd and also the addition of lipase to the milk as well as to the curd.

EXAMPLE V

Process cheese is made incorporating varying levels of the natural cheese of intensified flavor prepared in accordance with Example IV. A basic preblend comprising 40 percent body cheese approximately one month old, 30 percent short held cheese approximately three months old, and 30 percent aged Cheddar cheese is prepared. Five process cheese samples are prepared in which 5 percent, 10 percent, 20 percent, 30 percent, and 50 percent of the preblend is replaced by the intensely flavored cheese of Example IV. A control sample containing no added intensely flavored cheese is also prepared.

The process cheese samples are prepared in accordance with conventional processing techniques by heating the comminuted cheese together with usual emulsifier salts to a temperature of 165° F. for a period of time sufficient to cause the cheese particles to melt and form a homogeneous mass. The process cheese is then packaged and refrigerated.

The process cheese samples containing the intensely flavored cheese of Example IV were compared against the control sample for American cheese flavor. All samples were judged to have a more pronounced American cheese flavor than the control sample. The 50 percent sample flavor was considered too strong for average consumption and the samples containing 5 to 30 percent intensely flavored cheese were considered acceptable.

EXAMPLE VI 1000 pounds of raw milk is subjected to subpasteurization heat treatment of 135° F. for five seconds. The milk is cooled to a temperature of 88° F. and is inoculated with an *L. lactis* culture at a level of 13.0 pounds of the liquid culture per 1000 pounds of milk. The inoculated milk is incubated for a period of one hour at a temperature of 88° F. until a titratable acidity of 0.17 percent is obtained in the milk.

The milk is then set with 100 cc's of single strength calf rennet per 1000 pounds of milk. A setting period of thirty minutes is allowed for coagulation of the milk after addition of the rennet. The coagulum that is formed is then cut into ¼ inch curd cubes with curd knives and the titratable acidity of the whey at the time of cutting is 0.11.

The curd is lightly stirred in the whey for a period of fifteen minutes after cutting and the curd is then cooked in the whey to a temperature of 103° F., allowing thirty minutes to attain the cooking temperature. The curd and whey are stirred vigorously for about ninety minutes after the cooking step until a titratable acidity in the whey of 0.17 and a curd pH of 5.80 are reached.

Thereafter, the curd and whey mixture is pumped to a drain table while maintaining the cooking temperature of 103° F. The whey is drawn from the curd on the drain table until the whey level is slightly higher than that of the curd level. Further acidity is then developed in the curd while the curd and whey are maintained on the drain table. The remaining whey is drawn from the curd when the whey titratable acidity is 0.28 and when the cured pH is 5.30. The whey is permitted to drain freely for about fifteen minutes and the curd is then salted by adding 2.0 pounds of sodium chloride salt per 1000 pounds of milk. 19.9 grams of Italase C enzyme obtained from the throat tissue of calves and 14.0 grams of Catalase K enzyme obtained from the throat tissue of kids or lambs is then added per 100 pounds of curd. A protease enzyme, designated Rhozyme P-53, is added at a level of 5.75 grams of enzyme per 100 pounds of curd.

The enzymes and salt are thoroughly mixed in the curd and the curd is then packed into hoops at a level of 45.0–47.0 pounds of curd per hoop. The curd is pressed in the hoop at a pressure of 17 psi for a period of about twelve hours at room temperature so as to drain additional whey from the curd and to press the curd into a cheese block. The cheese block is then removed from the hoop and is subjected to 25 inches of vacuum for one hour. The cheese block is then packaged in a foil wrapper and is cured for six weeks at a temperature of 72° F. At the end of the six weeks period, the curd has developed a highly intensified flavor, which flavor level is substantially higher than usually associated with American-type cheese. The flavor level is judged to be too intense for direct eating, but is considered very suitable for use as an ingredient in the manufacture of process cheese.

EXAMPLE VII 1000 pounds of raw milk is subjected to pasteurization heat treatment of 161° F. for thirty seconds. The milk is adjusted to a temperature of 88° F. and is inoculated with an *L. lactis* culture at a level of 13.0 pounds of the liquid culture for each 1000 pounds of milk. A *Micrococcus Cohn* subgroup 2 liquid proteolytic culture, ATCC No. 21829, is added to the milk at a level of 2.5 pounds of liquid culture per 1000 pounds of milk. An *L. caseii* liquid culture is also added to the milk at a level of 2.0 pounds of the culture per 1000 pounds of milk. Italase C lipase is added to the milk at a level of 0.25 grams per 1000 pounds of milk. Catalase KL lipase is added to the milk at a level of 0.17 grams per 1000 pounds of milk. The inoculated milk medium is then set and curd is manufactured by the stirred curd process described herein. Lipase and protease are then added to the curd as set forth in Example VI. The curd particles are formed into a cheese and the cheese is then cured for six weeks at a temperature of 72° F. At the end of the six weeks period the cheese has developed a highly intensified flavor, which flavor level is substantially higher than usually associated with American-type cheese.

The flavor level is judged to be too intense for direct eating, but is considered very suitable for use as an ingredient in the manufacture of process cheese. Process cheese containing 10 percent of the cheese product of this Example has a desirable American cheese flavor and is considered to be of excellent quality.

EXAMPLE VIII 1000 pounds of raw milk is made into curd particles in accordance with the procedure of Example VI. A mixture of lipase and protease is added to the curd particles as described in Example VI. A *Micrococcus Cohn* subgroup 2 proteolytic micrococcus, ATCC No. 21829, is added to the curd particles prior to curing at a level of 1.0 pounds of culture per 100 pounds of curd. An *L. lactis* liquid culture is also added to the curd particles at a level of 1.0 pounds per 100 pounds of curd. The curd particles are then formed into a cheese and the cheese is cured as described in Example VI. After curing, the cheese has a desirable high level of flavor that is judged to be somewhat less harsh than the flavor of the cheese prepared in accordance with Example VI.

EXAMPLE IX

A 40-pound block of cheese prepared in accordance with the method of Example V is crumbled by hand to provide curd particles. The cheese block is easily crumbled and the curd particles appear to retain their identity throughout the curing period.

The curd particles are added to a bread dough formulation at the time of mixing the dough. After the bread dough has been baked, a cheese-flavored bread is obtained with a high and desirable level of Cheddar cheese flavor. The curd particles are slightly melted but discrete curd particles are discernible in the bread. The flavor is substantially more intense than is obtained when Cheddar cheese produced by a conventional manufacturing process is added to bread dough.

EXAMPLE X

Three samples of cheese having intensified American cheese flavor are prepared in accordance with Example I utilizing papain as the source of proteolytic enzyme. In each of Samples X-A, X-B, and X-C the lipase source added to the curd prior to curing is 7.5 grams Italase C, 5.25 grams Capalase KL. Sample X-A has 0.01 gram papain added; Sample X-B has 0.10 gram papain added; Sample X-C has 1.0 gram papain added. The curd is then cured at 72° F.

After approximately twenty-five days, the samples are analyzed for free fatty acid content, the results of which are set forth in Table VIII.

TABLE VIII

| Sample | $C_2$ | $C_4$ | $C_6$ | $C_8$ | $C_{10}$ |
|---|---|---|---|---|---|
| X-A | 0.038 | 0.257 | 0.092 | 0.025 | 0.051 |
| X-B | 0.027 | 0.249 | 0.090 | 0.025 | 0.047 |

TABLE VIII-continued

| Sample | $C_2$ | $C_4$ | $C_6$ | $C_8$ | $C_{10}$ |
|---|---|---|---|---|---|
| X-C | 0.048 | 0.240 | 0.085 | 0.022 | 0.043 |

After curing at 72° F. for six weeks, each of the cheese samples has a highly intensified American-type cheese flavor and each is useful as a flavoring ingredient for process cheese.

What is claimed is:

1. A method for the manufacture of natural American-type cheese having highly intensified American cheese flavor components, comprising preparing cheese curd from a milk source by an American cheese make procedure, separating the curd from the whey, salting the curd, adding to the curd a source of a proteolytic enzyme and a source of a lipolytic enzyme selected from calf throat tissue lipase, kid throat tissue lipase, lamb throat tissue lipase, and mixtures thereof, and curing said curd at a temperature above about 50° F., the amount of lipolytic enzyme and the duration of curing being selected to provide a total free $C_2$–$C_{10}$ fatty acid content in said cheese of at least about 0.46 percent by weight and a free $C_4$ fatty acid content of at least about 0.32 percent by weight.

2. A method in accordance with claim 1 wherein the milk source is inoculated with a source of a proteolytic micrococcus, a self-limiting lipase, and a flavoring microorganism.

3. A method in accordance with claim 2 wherein a source of a proteolytic micrococcus and a flavoring microorganism are added to the curd.

4. A method in accordance with claim 1 wherein the curing temperature is between about 50° F. and about 85° F.

5. A method in accordance with claim 3 wherein the curing temperature is between about 50° F. and about 85° F.

6. A method in accordance with claim 2 wherein calf throat tissue lipase, kid throat tissue lipase, lamb throat tissue lipase, and mixtures thereof are the source of both the lipolytic enzyme and the proteolytic enzyme.

7. A method in accordance with claim 1 wherein the source of proteolytic enzyme is selected from papain and proteases derived from A. oryzae, A. flavus-oryzae, B. subtilus, and mixtures thereof.

8. A method in accordance with claim 1 wherein the lipase is present at a level of between about 20 and about 45 grams per 100 pounds of curd.

9. A method in accordance with claim 8 wherein the protease is present at a level of between about 1 and about 10 grams per 100 pounds of curd.

10. A method in accordance with claim 2 wherein the proteolytic micrococcus is *Micrococcus Cohn*, subgroups 1 to 4.

11. A method in accordance with claim 10 wherein the flavoring microorganism is a homofermentative lactobacillus selected from *L. lactis, L. bulgaricus,* and *L. caseii.*

12. In a method for the manufacture of process cheese wherein a mixture of aged American-type cheese having a conventional American cheese flavor and unaged cheese having minimal American cheese flavor is mixed with emulsifiers, heated to form a homogeneous molten cheese mass and cooled, the improvement comprising replacing at least about 5 percent of said cheeses with a cured natural American cheese product having intensified American cheese flavor components produced by the method of claim 1.

13. A method in accordance with claim 12 wherein the source of proteolytic enzyme is selected from papain and microbial proteases derived from A. oryzae, A. flavus-oryzae, B. subtilus and mixtures thereof.

14. A method in accordance with claim 13 wherein the milk source from which said cheese product is made is inoculated with a proteolytic micrococcus and a flavoring microorganism.

15. A method in accordance with claim 14 wherein said cheese product has a proteolytic micrococcus and a flavoring microorganism added to the curd prior to curing.

16. A natural American-type cheese product having highly intensified American cheese flavor components produced by the method of claim 1.

17. A natural American-type cheese product having highly intensified American cheese flavor components in accordance with claim 16 wherein the source of proteolytic enzyme is selected from papain and proteases derived from A. oryzae, A. flavus-oryzae, B. subtilus, and mixtures thereof.

18. A natural American-type cheese product having highly intensified American cheese flavor components in accordance with claim 17 having a source of proteolytic micrococcus and a flavoring microorganism incorporated in the curd prior to curing.

19. Process cheese comprising between about 5 and about 30 percent by weight of a cheese product in accordance with claim 16.

20. Process cheese comprising between about 5 and about 30 percent by weight of a cheese product in accordance with claim 18.

* * * * *